(12) United States Patent
Frye (10) Patent No.: US 11,423,355 B2
(45) Date of Patent: *Aug. 23, 2022

(54) RETAIL SUPPLY CHAIN MANAGEMENT SYSTEM

(71) Applicant: INMOTUS PTY LTD, Melbourne (AU)

(72) Inventor: Gregory Frye, Richmond (AU)

(73) Assignee: INMOTUS PTY LTD, Melbourne (AU)

( * ) Notice: Subject to any disclaimer, the term of this patent is extended or adjusted under 35 U.S.C. 154(b) by 153 days.

This patent is subject to a terminal disclaimer.

(21) Appl. No.: 16/951,899

(22) Filed: Nov. 18, 2020

(65) Prior Publication Data

US 2021/0073733 A1 Mar. 11, 2021

Related U.S. Application Data

(63) Continuation of application No. 16/312,881, filed as application No. PCT/AU2018/050503 on May 24, 2018, now Pat. No. 10,878,378.

(30) Foreign Application Priority Data

May 26, 2017 (AU) .............................. 2017901998

(51) Int. Cl.
*G06Q 10/08* (2012.01)
*G06Q 30/02* (2012.01)
*G06K 7/14* (2006.01)

(52) U.S. Cl.
CPC ....... *G06Q 10/0875* (2013.01); *G06Q 10/087* (2013.01); *G06Q 30/0283* (2013.01); *G06K 7/1413* (2013.01)

(58) Field of Classification Search
CPC ............. G06Q 10/0875; G06Q 10/087; G06Q 30/0283; G06K 7/1413
See application file for complete search history.

(56) References Cited

U.S. PATENT DOCUMENTS 7,552,066 B1 * 6/2009 Landvater .......... G06Q 30/0202
705/7.25
7,774,243 B1 * 8/2010 Antony ................ G06Q 10/087
53/445

(Continued)

OTHER PUBLICATIONS

K. H. Leung et al., "Design of a case-based multi-agent wave picking decision support system for handling e-commerce shipments," 2016 Portland International Conference on Management of Engineering and Technology (PICMET), 2016, pp. 2248-2256, doi: 10.1109/PICMET.2016.7806645. (Year: 2016).*

(Continued)

*Primary Examiner* — Ashford S Hayles
(74) *Attorney, Agent, or Firm* — Innovation Capital Law Group, LLP; Vic Lin (57) ABSTRACT

The present supply chain management system has an e-commerce subsystem having a product inventory database comprising product SKU and pricing data and an e-commerce frontend interfacing the product inventory database for receiving retailer e-commerce orders. The system also has an order management subsystem having an aggregation controller for aggregating the retailer e-commerce orders into supply orders, an aggregation optimizer for optimizing the supply orders; and an order dispatch controller for dispatching the supply orders to suppliers. The system also has an electronic warehouse infrastructure having a pick grid controller having product tracking electronic scanning devices, the pick grid controller configured for generating pick grid instructions for pick-to-zero product placement from supplier pallets received for the supply orders to order (Continued)

pallets configured according to the retailer e-commerce orders.

13 Claims, 5 Drawing Sheets

(56) References Cited

U.S. PATENT DOCUMENTS

| | | | | |
|---|---|---|---|---|
| 7,881,987 B1* | 2/2011 | Hart | G06Q 30/0633 | 705/26.81 |
| 7,987,107 B2* | 7/2011 | Wilson | G06Q 10/0836 | 705/7.12 |
| 8,326,679 B1* | 12/2012 | Rowe | G06Q 10/08 | 705/28 |
| 8,407,110 B1* | 3/2013 | Joseph | G06Q 10/087 | 705/26.81 |
| 8,620,707 B1* | 12/2013 | Belyi | G06Q 10/087 | 705/28 |
| 8,838,612 B2* | 9/2014 | Berlener | G06Q 10/087 | 705/26.81 |
| 10,546,262 B2* | 1/2020 | Wilkins | G06Q 10/087 | |
| 10,776,750 B2* | 9/2020 | Lindbo | G06Q 10/087 | |
| 2002/0072988 A1* | 6/2002 | Aram | G06Q 30/0601 | 705/26.1 |
| 2002/0099622 A1* | 7/2002 | Langhammer | G06Q 30/02 | 705/27.1 |
| 2002/0124389 A1* | 9/2002 | Matson | B65G 1/1373 | 29/700 |
| 2003/0033205 A1* | 2/2003 | Nowers | G06Q 30/06 | 705/26.8 |
| 2003/0149644 A1* | 8/2003 | Stingel, III | G06Q 10/08 | 705/28 |
| 2004/0098315 A1* | 5/2004 | Haynes | G06Q 30/0641 | 705/26.8 |
| 2005/0197882 A1* | 9/2005 | Fotteler | G06Q 30/0205 | 705/7.34 |
| 2005/0288989 A1* | 12/2005 | Kim | G06Q 30/0202 | 705/7.31 |
| 2006/0235769 A1* | 10/2006 | Cheng | G06Q 50/28 | 705/28 |
| 2007/0102329 A1* | 5/2007 | Rosenbaum | B07C 3/14 | 209/584 |
| 2007/0294137 A1* | 12/2007 | Zett | G06Q 30/0635 | 705/26.81 |
| 2008/0131255 A1* | 6/2008 | Hessler | B65B 35/50 | 901/14 |
| 2009/0048987 A1* | 2/2009 | Sweeney | G06Q 30/0283 | 705/400 |
| 2009/0082902 A1* | 3/2009 | Foltz | G06Q 10/087 | 700/214 |
| 2010/0262521 A1* | 10/2010 | Robinson | G06Q 30/06 | 705/29 |
| 2011/0184837 A1* | 7/2011 | Biro | G06Q 10/087 | 715/702 |
| 2012/0095935 A1* | 4/2012 | Mowat | G06Q 10/08 | 705/333 |
| 2012/0323633 A1* | 12/2012 | Chowdhary | G06Q 10/087 | 705/7.31 |
| 2013/0018696 A1* | 1/2013 | Meldrum | G06Q 10/06315 | 705/348 |
| 2013/0073477 A1* | 3/2013 | Grinberg | G06Q 30/00 | 705/332 |
| 2013/0297435 A1* | 11/2013 | Prellwitz | G06Q 10/083 | 705/22 |
| 2014/0074745 A1* | 3/2014 | Nashif | G06Q 10/04 | 705/337 |
| 2014/0136255 A1* | 5/2014 | Grabovski | G06Q 10/063114 | 705/7.14 |
| 2014/0324491 A1* | 10/2014 | Banks | G06Q 10/087 | 705/7.12 |
| 2015/0046227 A1* | 2/2015 | Asadi | G06Q 10/0637 | 705/7.36 |
| 2015/0199627 A1* | 7/2015 | Gould | G06Q 10/087 | 705/7.12 |
| 2015/0254589 A1* | 9/2015 | Saxena | G06Q 10/06315 | 705/7.25 |
| 2015/0294260 A1* | 10/2015 | Napoli | G06Q 10/083 | 705/337 |
| 2015/0307278 A1* | 10/2015 | Wickham | G05B 13/041 | 700/216 |
| 2016/0055503 A1* | 2/2016 | Chan | G06Q 30/0205 | 705/7.34 |
| 2016/0092831 A1* | 3/2016 | Qin | G06Q 10/06313 | 705/28 |
| 2016/0110733 A1* | 4/2016 | Ray | G06Q 30/0202 | 705/7.31 |
| 2016/0210591 A1* | 7/2016 | Lafrance | G06Q 10/047 | |
| 2016/0297611 A1* | 10/2016 | Williams | B25J 3/00 | |
| 2016/0307146 A1* | 10/2016 | Nanda | G06Q 10/087 | |
| 2017/0046759 A1* | 2/2017 | Chandrasekaran | G06Q 20/12 | |
| 2017/0083967 A1* | 3/2017 | Shiely | G06Q 30/0639 | |
| 2017/0098185 A1* | 4/2017 | Soldate | G06Q 10/083 | |
| 2017/0116572 A1* | 4/2017 | Natarajan | G06Q 10/0875 | |
| 2017/0147967 A1* | 5/2017 | Behera | G06Q 10/087 | |
| 2017/0286907 A1* | 10/2017 | Rizkallah | G06Q 10/0875 | |
| 2017/0315918 A1* | 11/2017 | Nikitaki | G06F 12/0888 | |
| 2017/0316370 A1* | 11/2017 | Putcha et al. | G06Q 10/083 | |
| 2017/0323250 A1* | 11/2017 | Lindbo | G06Q 30/0621 | |
| 2017/0337509 A1* | 11/2017 | Veras-Nunez | G06Q 10/087 | |
| 2017/0351989 A1* | 12/2017 | Langdon | G06Q 10/06315 | |
| 2018/0060764 A1* | 3/2018 | Hance | G06Q 10/06315 | |
| 2018/0068255 A1* | 3/2018 | Hance | G06Q 10/043 | |
| 2018/0089612 A1* | 3/2018 | Kalra | G06Q 10/087 | |
| 2018/0211203 A1* | 7/2018 | Greenberg | G06Q 10/087 | |
| 2018/0336514 A1* | 11/2018 | Ranjanghatmuralidhar | G06F 16/90335 | |
| 2019/0138978 A1* | 5/2019 | Johnson | G06Q 10/087 | |
| 2019/0347606 A1* | 11/2019 | Malecha | G06Q 30/0223 | |
| 2020/0034780 A1* | 1/2020 | Sikka | G06N 20/00 | |

OTHER PUBLICATIONS

K. H. Leung, K. L. Choy, M. C. Tam, C. H. Y. Lam, C. K. H. Lee and S. W. Y. Cheng, "A hybrid RFID case-based system for handling air cargo storage location assignment operations in distribution centers," 2015 Portland International Conference on Management of Engineering and Technology (PICMET), 2015, (Year: 2015).*

Derhami, S.; Smith, J. S.; Gue, K. R. Optimising space utilisation in block stacking warehouses. International Journal of Production Research, [s. l.], v. 55, n. 21, p. 6436-6452, 2017. DOI 10.1080/00207543.2016.1154216. (Year: 2017).*

Parikh, P. J. (2006). Designing order picking systems for distribution centers (Order No. 3258808). Available from ProQuest Dissertations & Theses Global. (304968311). (Year: 2006).*

* cited by examiner

RETAIL SUPPLY CHAIN MANAGEMENT SYSTEM

CROSS REFERENCE TO RELATED APPLICATIONS

This invention is a continuation of U.S. patent application Ser. No. 16/312,881, filed Dec. 21, 2018, the contents of which are herein incorporated by reference.

FIELD OF THE INVENTION

This invention relates to electronic retail supply chain management systems.

BACKGROUND OF THE INVENTION

Retail supply chain management systems are used for tracking dispatch and delivery of retail goods in a supply chain from suppliers to retailers.

Prior art retail supply management systems are generally "push ordering" systems which employ warehouse stockpiling to optimize delivery times and fulfil demand. Such prior art push ordering systems may comprise electronic warehouse infrastructure to control the routing of products through a pick grid wherein supplier products are stockpiled on racks and recorded against rack locations such that, when fulfilling retailer orders, the system controls the movement of order pallet between the racks for picking and electronically scanning the requisite ordered goods from the racks until the orders are fulfilled For example, WO 2016/081794 A1 (DELIVERIGHT LOGISTICS, INC.) 26 May 2016 [hereinafter referred to as D1] discloses a conventional push ordering system delivery management system. D1 is characterized in managing quality between distributors and manufacturers by using an inspection component (which can, for example identify potential damage to a good based on image analysis) configured to require inspection of items at each of the plurality of delivery events (e.g., pick up, freight aggregation, line shipping, local shipping, etc.).

Furthermore, US 2009/0112675 A1 (SERVAIS) 30 Apr. 2009 [hereinafter referred to as D2] discloses a conventional "push ordering" system. D2 is characterized in seeking to manage product quantities while concurrently tracking the quantities of the product throughout all processes of the system.

However, such prior art push ordering retail supply chains, whilst being able to minimize delivery times and meet customer demand, have problems associated with inventory stockpiling wherein, for example, stock held for too long may spoil and conversely, insufficient stock levels may result in delivery delays.

As such, such prior art push ordering retail supply chains generally seek to optimize warehouse inventory stock levels to address these problems.

It is to be understood that, if any prior art information is referred to herein, such reference does not constitute an admission that the information forms part of the common general knowledge in the art, in Australia or any other country.

SUMMARY OF THE DISCLOSURE

There is provided herein a supply chain management system and, more particularly, to a reversed "pull ordering" tracking retail supply chain management system. The present electronic retail supply chain management system intelligently aggregates retailer e-commerce orders into optimized supplier orders in real time in response to actual or predicted retail order demand and/or dynamic supply chain management parameters for pick-to-zero warehouse management product electronic scanning and picking from supplier pallets, received for the supply orders, to order pallets, configured according to the retailer e-commerce orders, to adaptively avoid or minimize inventory stockpiling, minimize the number of orders, minimize product cost, minimize delivery cost and/or optimize delivery times.

Specifically, the present supply chain management comprises three primary interoperating electronic subsystems comprising an e-commerce subsystem for controlling a plurality of e-commerce orders for a plurality of product SKUs, an order management system comprising an aggregation controller for controlling the aggregation of the plurality of e-commerce orders into a plurality of supplier orders and electronic warehouse infrastructure comprising a pick grid controller in operable communication with a plurality of electronic scanning devices, operable to, upon receipt of inbound supplier pallets for the supplier orders, to control the pick-to-zero picking of products from the supplier pallets to fixed order pallets The present e-commerce subsystem may comprise a product inventory database comprising product SKU and pricing data stored therein. The e-commerce subsystem may comprise an API for real time supplier pricing data modification and an e-commerce front-end API for ordering of products from the inventory database by retailers.

Furthermore, the present order management subsystem performs order aggregation dispatch control processing wherein a plurality of e-commerce orders for a plurality of product SKUs are optimized into a plurality of supply orders which are dispatched to suppliers using a supplier order dispatch controller.

Furthermore, the present pick grid controller differs from prior art pick grid controllers in that the present pick grid controller optimizes pick-to-zero processing from supplier pallets (typically mobile) to order pallets (typically fixed) as opposed to prior art systems which control the movement of order pallets between static stockpile racks. Specifically, the present pick grid controller is configured for reading data from electronic scanning devices for tracking supplier pallets, order parts and product SKUs for controlling the pick-to-zero placement of products on fixed order pallets from the mobile supplier pallets received for the optimized supply orders.

Furthermore, the present system may comprise inbuilt optimizer modules for intelligently optimizing aggregation of supplier orders, picking of products and dispatch of order pallets.

Specifically, the order management subsystem may comprise an aggregation optimizer for optimizing the operation of the aggregation controller to optimize supply orders and the dispatch thereof.

Furthermore, the electronic warehouse infrastructure may comprise a pick grid optimizer for optimizing the pick grid controller.

Furthermore, the electronic warehouse infrastructure may comprise a dispatch control for optimizing the dispatching of order pallets.

These optimizer modules may implement machine learning wherein a machine learning module is trained with training data for the generation of optimized parameters which are then used to control a trained/optimized system so as to intelligently and dynamically adapt to nuances and changes in pull demand supply chain variables.

As can be appreciated from the above, the present supply chain management system is characterized in several respects from prior art push ordering systems such as D1 and D2 above including in comprising the aggregation controller and optimizer which aggregates retailer e-commerce orders into optimized supply orders which are dispatched to suppliers. As such, the present aggregation controller and optimizer may optimize the minimization of inventory levels, number of orders, product and delivery costs and/or optimized delivery time by product type.

Furthermore, the present supply chain management system is characterized in comprising the electronic warehouse infrastructure comprising the pick grid controller and optimizer configured for optimizing pick-to-zero product placement from mobile supplier pallets for the optimized supply orders to fixed order pallets configured according to the retailer e-commerce orders.

According to one aspect, there is provided a supply chain management system comprising: an e-commerce subsystem comprising: a product inventory database comprising product SKU and pricing data; an e-commerce frontend interfacing the product inventory database for receiving retailer e-commerce orders; an order management subsystem comprising: an aggregation controller for aggregating the retailer e-commerce orders into supply orders; an aggregation optimizer for optimizing the supply orders; an order dispatch controller for dispatching the supply orders to suppliers; electronic warehouse infrastructure comprising: a pick grid controller having product tracking electronic scanning devices, the pick grid controller configured for generating pick grid instructions for pick-to-zero product placement from supplier pallets received for the supply orders to order pallets configured according to the retailer e-commerce orders.

The pick grid controller may be configured for receiving at least one of product identifier, supplier pallet ID and order pallet ID data from the product tracking electronic scanning devices.

The pick grid controller may be configured for generating the pick grid instructions for maneuvering the supplier pallets between fixed order pallets within the warehouse.

The supply chain management system may further comprise a pick grid optimizer for optimizing the pick grid instructions.

The pick grid optimizer may be configured for at least one of minimizing the number of picks, optimizing packing of the order pallets in accordance with product type, minimizing the number of order pallets and optimizing packing of the order pallets in accordance with product priority type.

The supply chain management system may further comprise a delivery dispatch controller for controlling dispatch of the order pallets.

The pick grid controller may be operably coupled to the delivery dispatch controller for generating the pick grid instructions according to dispatching of the order pallets.

The supply chain management system may further comprise a delivery dispatch optimizer for optimizing the dispatch of the order pallets.

The delivery dispatch optimizer may be configured for at least one of minimizing the number of deliveries, minimizing delivery time, minimizing delivery distances, minimizing delivery cost and delivery of priority goods.

The e-commerce subsystem further may comprise an API interface for updating the pricing data.

The aggregation optimizer may comprise a machine learning module configured for generating optimizing parameters in accordance with target parameters and historical data and wherein the optimizing parameters may be used to optimize the supply orders in accordance with aggregation target parameters comprising at least one of minimizing inventory levels, minimizing the number of orders, minimizing product cost, minimizing delivery cost and optimizing delivery time by product type.

The pick grid optimizer may comprise a machine learning module configured for generating optimizing parameters in accordance with target parameters and historical data and wherein the optimizing parameters may be used to optimize the pick grid instructions in accordance with pick grid target parameters comprising at least one of minimizing the number of picks, optimizing the packing of the order pallets in accordance with product type, minimizing the number of order pallets and optimizing priority products.

The delivery dispatch optimizer may comprise a machine learning module configured for generating optimizing parameters in accordance with target parameters and historical data and wherein the optimizing parameters may be used to optimize wherein the dispatch instructions in accordance with dispatch target parameters comprising at least one of minimizing the number of deliveries, minimizing delivery time, minimizing delivery distances, minimizing delivery cost and optimizing priority goods.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
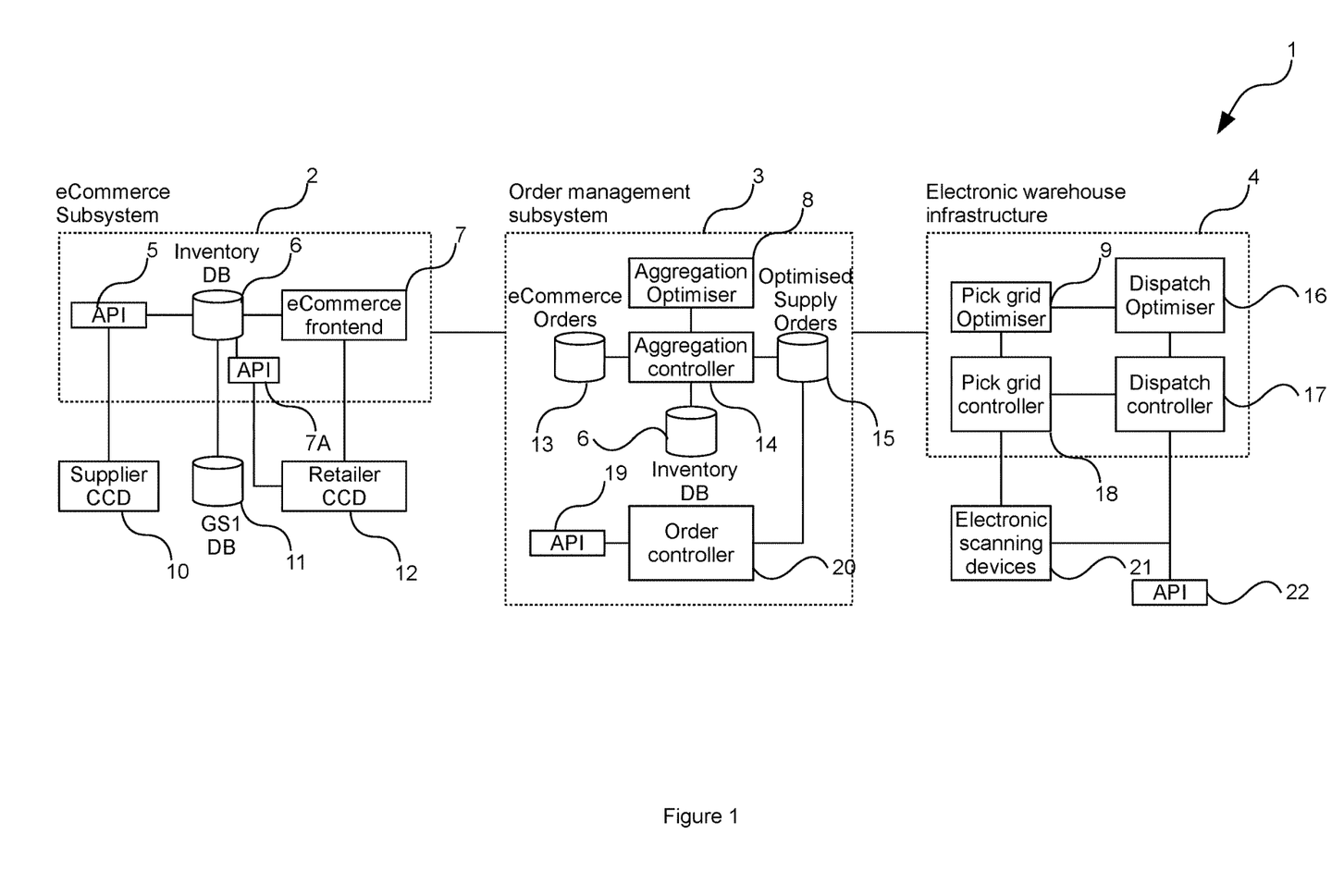
FIG. 1 shows a supply chain management system in accordance with an embodiment.

FIG. 1 shows a supply chain management system 1 being a technical implementation for pull demand retail supply chain retail product tracking and optimization.

The supply chain management system 1 is illustrated in FIG. 1 by functional demarcation for illustrative convenience. As such, it should be appreciated that the supply chain management system 1 may be implemented by a standalone computing devices/servers or various network topologies of interconnected computing devices/servers for implementing the technical functionality described herein.

Each constituent computing device may comprise a processor for processing digital data and a memory device for storing digital data including computer program code instructions in operable communication with the memory device. As such, the various computer processing functionality described herein may be embodied in computer program code modules for the various processes, which may be fetched by the processor for execution.

In the embodiment shown in FIG. 1, the computer componentry has been demarcated into three primary technical subsystems being the e-commerce subsystem 2, order management subsystem 3 and the electronic warehouse infrastructure 4.

The e-commerce subsystem 2 comprises an inventory database 6 which may comprise product SKU and pricing data.

The product SKU data may be populated using an SKU database, such as the Australian GS1 product SKU database 11.

The e-commerce subsystem 2 may comprise a product data API 5 exposing an interface which may be used by suppliers in updating product pricing data within the database 6. Specifically, various suppliers, using associated supplier client computing devices 10 may authenticate with the API 5 for such purposes.

Furthermore, the e-commerce subsystem 2 described herein may be further characterized in comprising a retailer e-commerce front-end 7 and API 7A wherein retailers, similarly using associated retailer client computer devices 12 may place a plurality of e-commerce orders for a plurality of product SKUs.

The system 1 further comprises an order management subsystem 3 technically configured for the aggregation of supply orders using the plurality of e-commerce orders.

Specifically, the order management subsystem 3 comprises an aggregation controller 14 configured for aggregating the e-commerce orders 13 into a plurality of supply orders 15. Specifically, in general terms, the aggregation controller 14 at least groups product SKU orders by supplier in generating the supply orders 15. In doing so, the aggregation controller 14 may extract data from the inventory database 6 so as to cross-reference product SKU and supplier related data for such purposes.

As alluded to above, the order management subsystem 3 may further comprise an aggregation optimizer 8 for optimizing the aggregation process in the manner described in further detail below. As such, the aggregation optimizer 8 is configured for optimizing the generation of the supply orders 15.

Having generated the optimized supply orders 15, the order management subsystem 3 may comprise an order controller 20 configured for placing orders with suppliers. Specifically, the order controller 20 may interface with a plurality of supplier APIs 19 so as to be able to electronically place such optimized supply orders 15 via associated supplier servers.

The system 1 further comprises electronic warehouse infrastructure 4 comprising warehouse storage and associated electronic tracking infrastructure for receiving supplier pallets and controlling the pick grid "pick-to-zero process" when loading order pallets.

Specifically, the electronic warehouse infrastructure 4 comprises a pick grid controller 18 in operable communication with a plurality of electronic scanning devices 21. The electronic scanning devices 21 may take the form of small form factor handheld electronic scanning devices able to read barcodes or other computer readable media.

For a supplier pallet arriving at the warehouse, the supplier pallet may comprise a supplier pallet ID barcode or a plurality of supplier product IDs for each of or a subset group of the products thereon.

The electronic scanning infrastructure of the electronic warehouse infrastructure 4 is distinguished in that the pick grid controller 18 is configured for tracking for the picking of products from fixed or movable supplier pallets to fixed order pallets (wherein the fixed order pallets may be configured in accordance with e-commerce orders received via the e-commerce front-end 7 or API 7a) as opposed to prior art electronic warehouse infrastructures which are configured for tracking for the picking of products from fixed stockpile racks to movable order pallets.

As such, for such handheld electronic scanning devices 21, operators may scan the supplier pallets, product SKUs and order pallets so as to allow the pick grid controller 18 to direct the picking process as products are picked from the supplier pallets to the order pallets.

The operation of the pick grid controller 18 may be optimized using a pick grid optimizer 9 as will be described in further detail below. The pick grid optimizer 9 is configured for optimizing the picking process in accordance with the various parameters.

The electronic warehouse infrastructure 4 further comprises a dispatch controller 17 for configuring the dispatch of the packed order pallets.

The dispatch controller 17 may read data from the electronic scanning devices 21 as the order pallets are dispatched and transportation network APIs 22 for the controlling of the dispatch of the packed order pallets.

A dispatch optimizer 16 may be used for optimizing the dispatch controller 17 in the manner described in further detail below, including in accordance with data received via the transportation network APIs 22.

Figure 2:
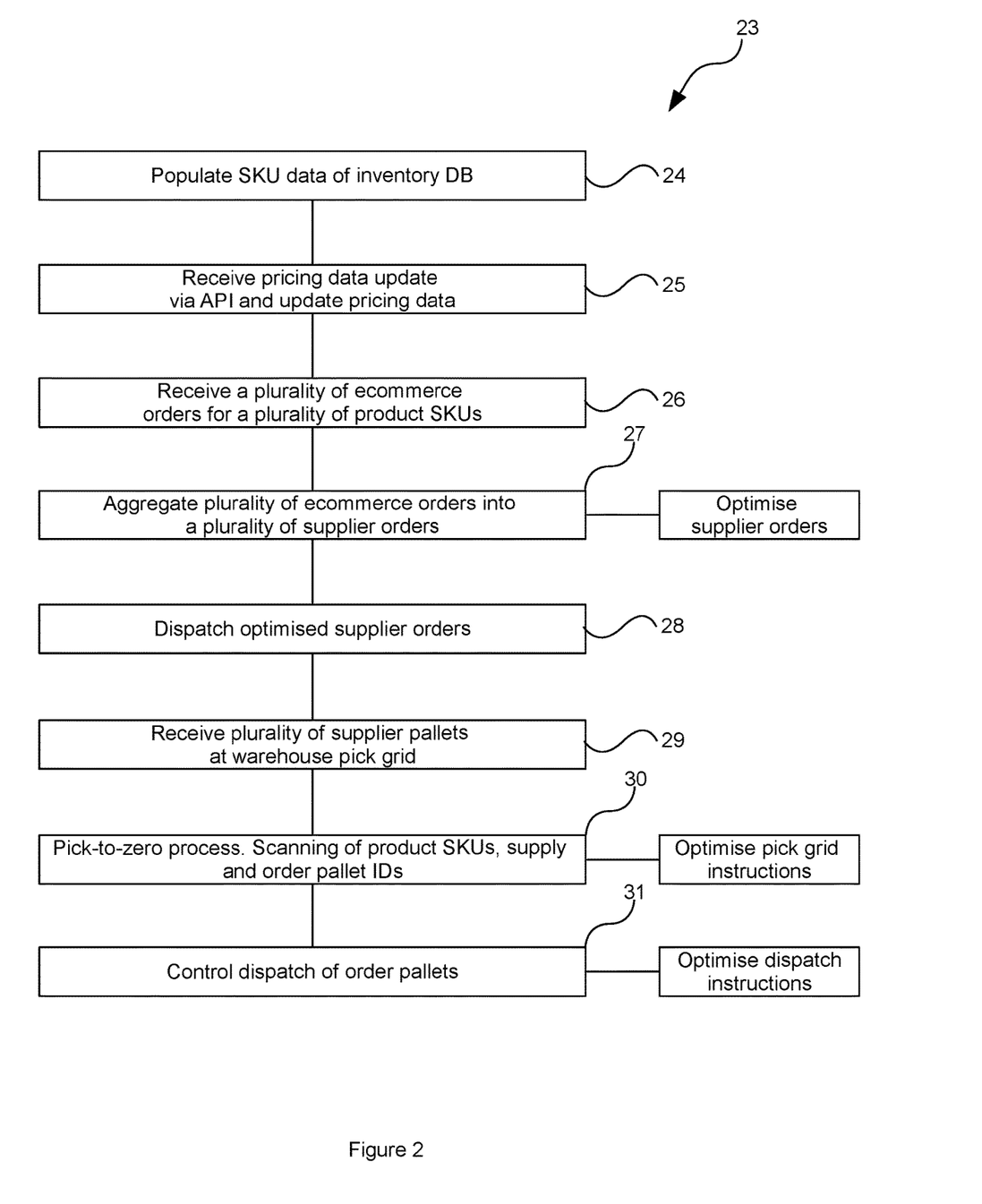
FIG. 2 shows exemplary processing performed by the system of FIG. 1.

Turning now to FIG. 2, there is shown exemplary processing 23 of the supply chain management system 1 for illustrating various technical functionality thereof.

The processing 23 may comprise the population 24 of the product inventory database 6 with product inventory data including product SKU and product pricing data. The product inventory database 6 may further comprise supplier data stored in relation to the product SKU data used by the aggregation controller 14 for resolving the e-commerce orders 13 into optimized supply orders 15.

The processing 23 may comprise receiving periodic pricing updates 25 via the API wherein suppliers, using associated supplier client computer devices 10 may authenticate with the API 5 for updating the pricing data associated with the product SKU data stored within the product inventory database 6. Such updating 26 may further comprise the incorporation of new product SKU data for new products.

Having the product inventory database 6 comprising product SKUs and pricing data stored in relation to the product SKUs, the processing may further comprise the e-commerce frontend 7 and API 7a receiving 26a plurality of e-commerce orders for a plurality of product SKUs from a plurality of retailers using a plurality of associated retailer client computing devices 12.

The e-commerce front-end 7 may further facilitate payment for the e-commerce orders.

The API 7a may further facilitate the issuing of electronic invoices for the e-commerce orders.

The e-commerce order data received via the e-commerce front-end 7 or API 7A are then conveyed to the e-commerce orders database 13 wherein the processing 23 further comprises aggregating 27 the plurality of e-commerce orders 13 into a plurality of supplier orders 15.

The aggregation 27 comprises the aggregation controller 14 aggregating product SKUs by suppliers with reference to the inventory database 6.

The aggregation 27 may further comprise the optimization of the supply orders 15 to generate optimized supply orders 15 using the aggregation optimizer 8 in the manner described in further detail below.

The optimized supply orders 15 are then conveyed to the order controller 20 wherein the processing 23 further comprises the dispatch 28 of the optimized supply orders using the order controller 20 which may utilize supplier server APIs 19.

The processing 23 may further comprise the receipt 29 of a plurality of supplier pallets at the warehouse pick grid. Each supplier pallet may comprise a plurality of products of each supplier. Typically, the warehouse pick grid may comprise a plurality of order pallets laid out according to the e-commerce orders and wherein the processing 23 further comprise "pick-to-zero" product picking wherein products are picked from the supplier pallets for placement on the order pallets in the manner directed by the pick grid controller 18.

The pick-to-zero process 30 may further utilize the pick grid optimizer 9 for optimizing the pick-to-zero process in the manner described in further detail below.

The processing 23 may further comprise the control of the dispatch of the order pallets 31 using the dispatch controller 17 which may read data from the electronic scanning devices 21 as order pallets are dispatched and transportation network data received via transportation network APIs 22.

The control of the dispatch of order pallets 31 may be optimized using the dispatch optimizer 16 in the manner described in further detail below.

The pick grid optimizer 9 of the electronic warehouse infrastructure may interact with the dispatch optimizer 16 to optimize picking in accordance with dispatch requirements.

Figure 3:
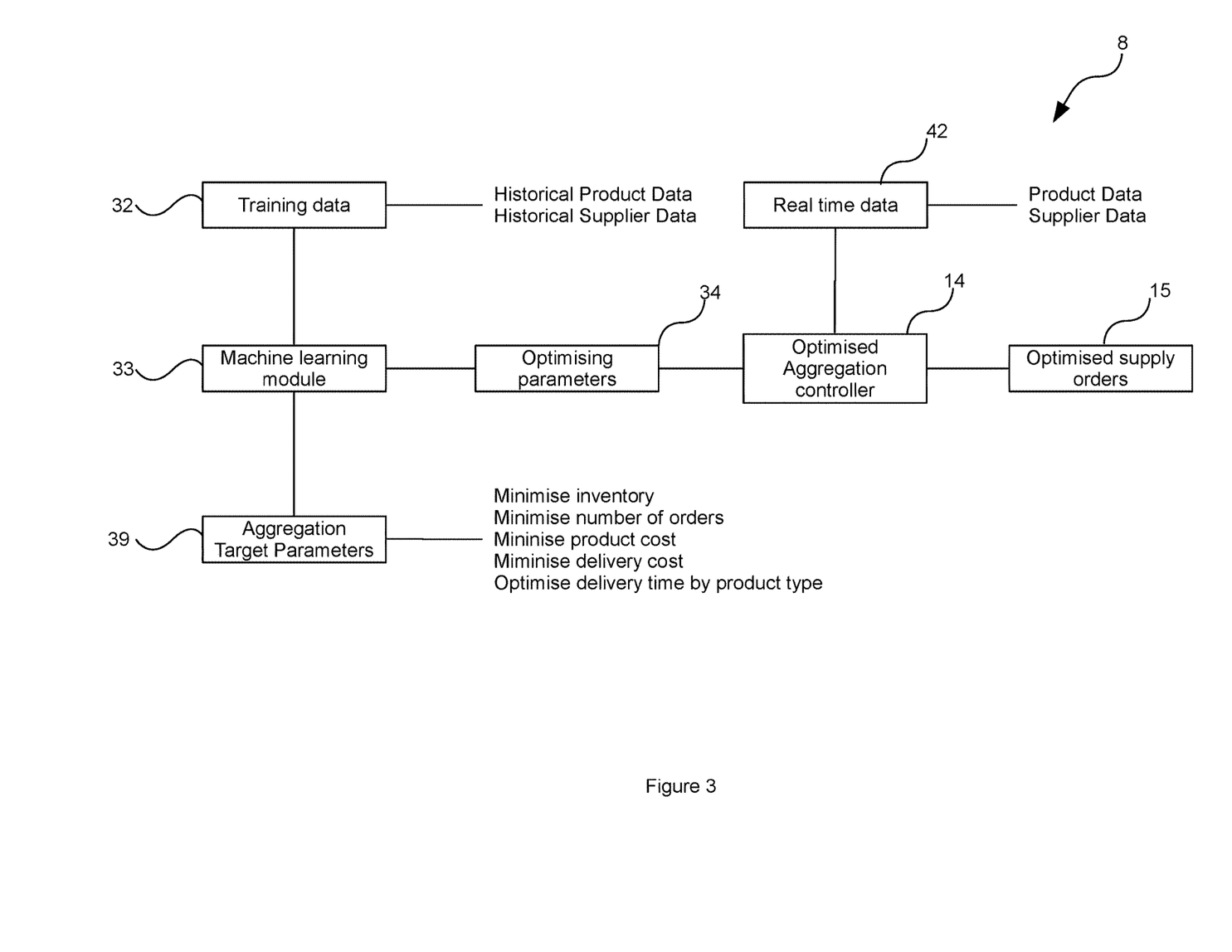
FIG. 3 shows an aggregation optimizer in accordance with an embodiment.
Figure 4:
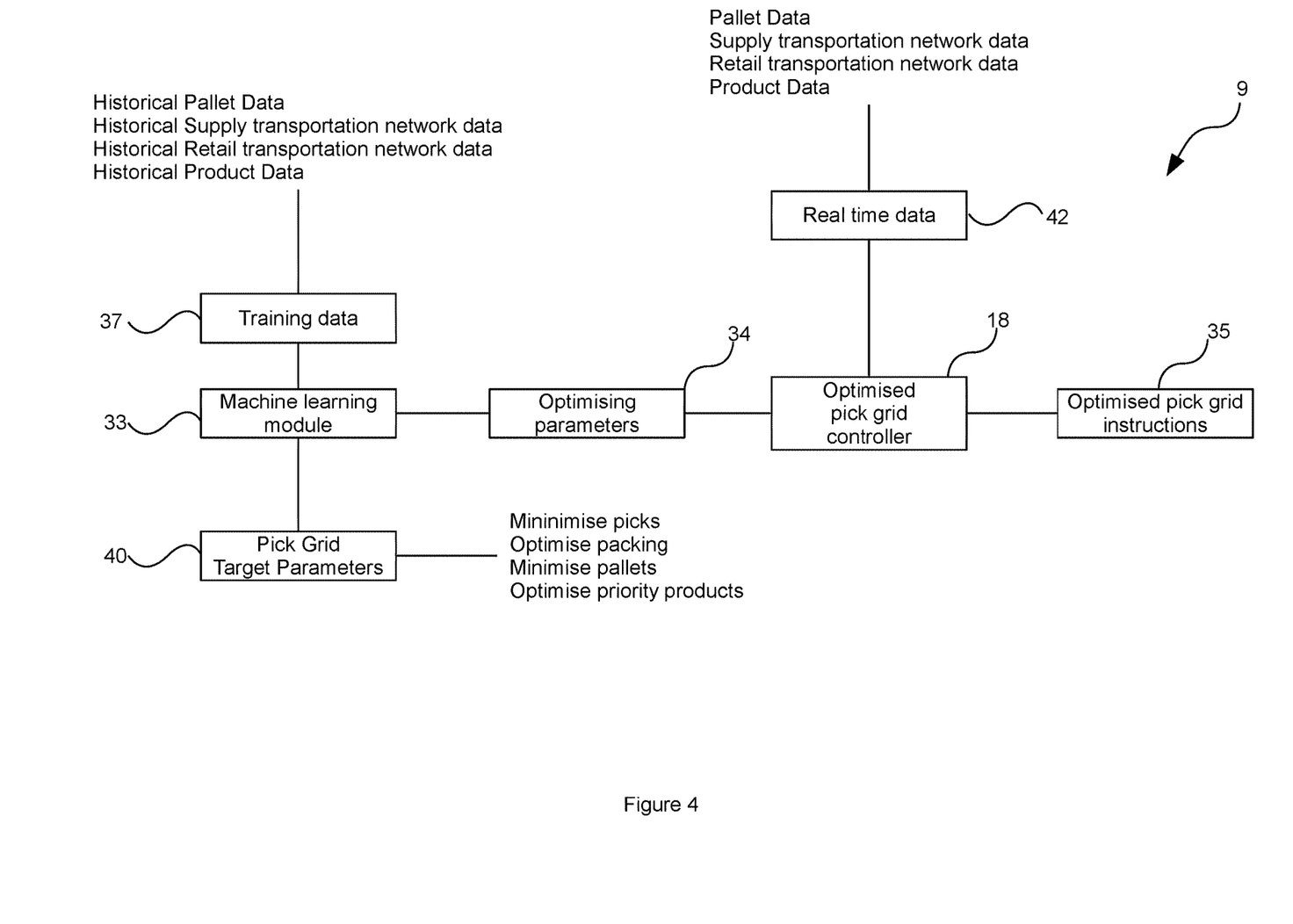
FIG. 4 shows a pick grid optimizer in accordance with an embodiment.
Figure 5:
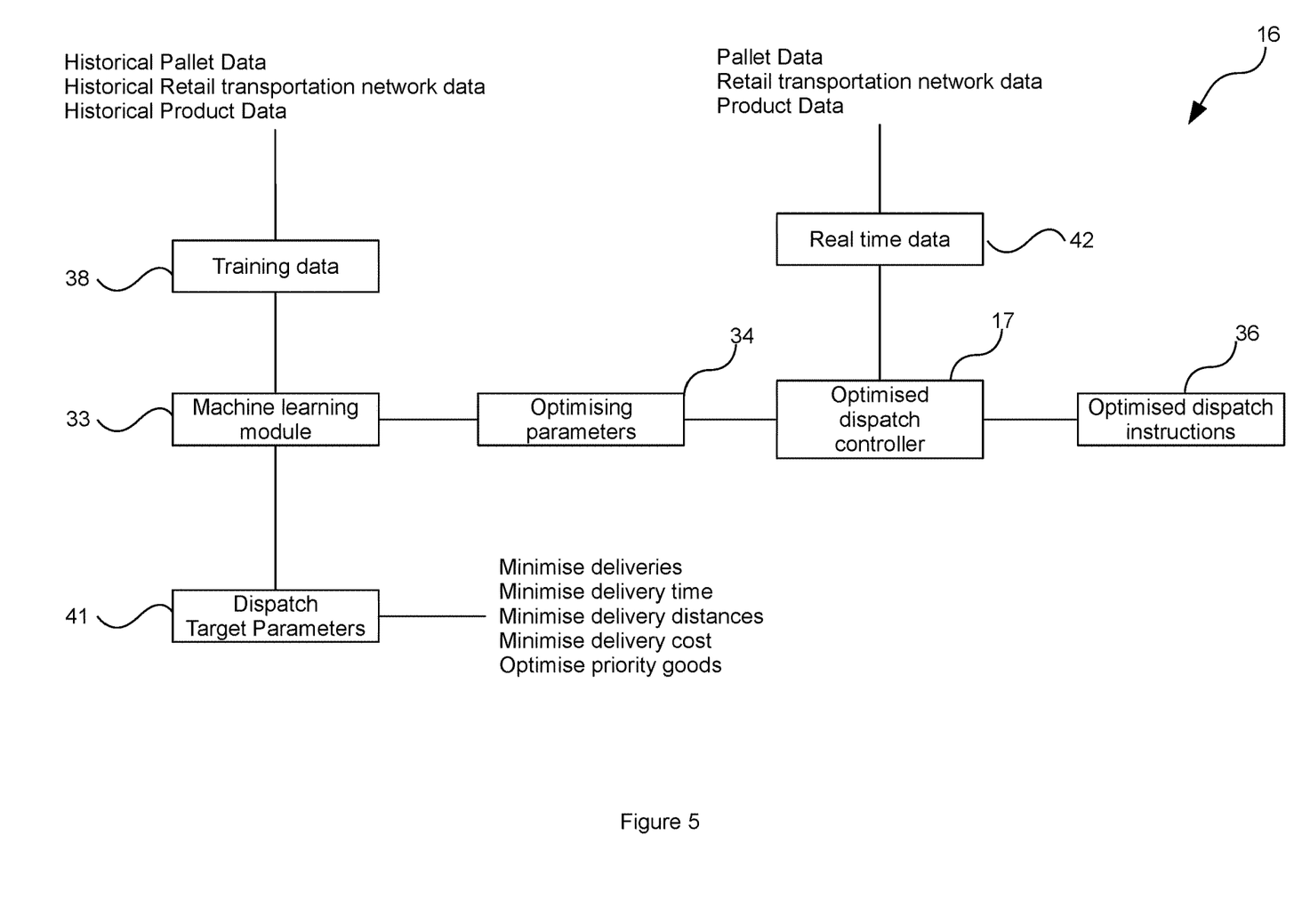
FIG. 5 shows a dispatch optimizer in accordance with an embodiment.

Turning now to FIGS. 3-5 there is shown the optimization process of the various optimization modules comprising the aggregation optimizer 8 shown in FIG. 3, the pick grid optimizer 9 shown in FIG. 4 and the dispatch optimizer 16 shown in FIG. 5.

In embodiments, the optimization process may utilize machine learning. In this embodiment, the process involves the utilization of a machine learning module 33 having as input training data 32, 37, 38 configured for generating optimizing parameters 34 for optimizing various target parameters 39-41.

The machine learning module 33, when optimizing the various target parameters 39-41 and using the training data 32, 37, 38 may generate optimizing parameters 34 which are then used to configure the optimized controllers, being the optimized aggregation controller 14, optimized pick grid controller 18 and optimized dispatch controller 17 for the generation of optimized results in accordance with real-time data 42, comprising, in this case, the optimized supply orders 15, optimized pick grid instructions 35 and optimized dispatch instructions 36 respectively.

Considering initially the aggregation optimizer 8 shown in FIG. 3, the aggregation target parameters 39 may comprise one or more of aggregation target parameters to minimize the number of orders placed, minimize the product cost, minimize the delivery cost and optimize delivery time by product type. It should be noted that the machine learning module 33 may optimize the optimizing parameters 34 in accordance with a combination of these parameters wherein, for example, there is a trade-off between minimizing the number of orders placed and minimizing product cost.

In one example, wherein the aggregation target parameters 39 includes a target parameter to optimize delivery time by product type, the machine learning module 33 may seek to optimize the delivery of time sensitive or necessity priority retail products, such as bottled water as opposed to other retail products such as floor mops or the like.

As such, the optimized supply orders 15 generated in this manner may, for the given product data, supplier data and the like, generate optimize supply orders 15 that seek to minimize, for example, the number of orders placed, minimize the product cost, minimize the delivery cost and optimize the delivery of priority retail products.

The embodiment shown in FIG. 4 shows the pick grid optimizer 9. In a similar manner as provided above, the pick grid optimizer 9 may be configured for optimizing the pick-to-zero pick grid process in accordance with various pick grid target parameters 40.

For example, the pick grid target parameters 40 may comprise target parameters to minimize the number of picks (i.e. minimize movement about the warehouse), optimize the packing of pallets wherein, for example, heavy items are placed first and lighter and/or more fragile items or loose items placed thereafter on top, minimize the number of pallets required to fulfil orders, optimize priority products wherein priority products are allocated to pallets for priority dispatch and the like.

The training data 37 may comprise historical pallet data, supply transportation network data, transportation network data, product data and the like.

As such, the optimized pick grid controller 18 may therefore, in accordance with the real-time data 42, optimize the target parameters 40 resulting in optimized pick grid instructions 35.

The embodiment shown in FIG. 5 shows the dispatch optimizer 16 wherein, similarly, the dispatch optimizer 16 may generate optimized dispatch instructions 16 optimizing various target parameters.

For example, the dispatch target parameters 41 may comprise target parameters to minimize the number of deliveries, minimize the delivery time, minimize delivery distances, minimize delivery cost, prioritize necessary goods and the like.

The machine learning module 33 may take into account pallet data, such as the locations of contents of pallets ready for dispatch, information relating to the retail transportation network data, product data and the like.

As such, the optimized dispatch controller 17, having the real-time data 42, may generate optimized dispatch instructions 36 taking into account information relating to the retail transportation network data, pallet data and product contents thereof.

As is shown in FIG. 1, the optimizers may work in conjunction wherein, for example, when prioritizing priority goods, the aggregation optimizer 8 may take into account supply transportation network data indicative of the locations of the various suppliers wherein, for example, orders may be placed to transport supplier products to the closest warehouses 4 to minimize delivery times and wherein, at those warehouses 4, the pick grid optimizer 9 may furthermore prioritize the picking of those necessary goods to pallets for priority dispatch and wherein, for example, the dispatch optimizer 16 may then generate optimized dispatch instructions 36 to minimize the delivery of the necessary goods via the retail transportation network.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A supply chain management system comprising:
   an e-commerce subsystem comprising:
      a product inventory database comprising product SKU and pricing data; and
      an e-commerce frontend interfacing the product inventory database for receiving retailer e-commerce orders;
   an order management subsystem comprising:
      an aggregation controller for aggregating the retailer e-commerce orders into supply orders;
      an aggregation optimizer for optimizing the supply orders;
      an order dispatch controller for dispatching the supply orders to suppliers; and
      a machine learning module configured for generating optimized parameters in accordance with target parameters and historical data; and
   electronic warehouse infrastructure comprising:
      a pick grid controller having product tracking electronic scanning devices, the pick grid controller configured for generating pick grid instructions for pick-to-zero product placement from supplier pallets received for the supply orders to order pallets configured according to the retailer e-commerce orders.

2. A supply chain management system as claimed in claim 1, wherein the pick grid controller is configured for receiving at least one of product identifier, supplier pallet ID and order pallet ID data from the product tracking electronic scanning devices.

3. A supply chain management system as claimed in claim 1, wherein the pick grid controller is configured for generating the pick grid instructions for maneuvering the supplier pallets between fixed order pallets within the warehouse.

4. A supply chain management system as claimed in claim 1, further comprising a pick grid optimizer for optimizing the pick grid instructions.

5. A supply chain management system as claimed in claim 4, wherein the pick grid optimizer is configured for at least one of minimizing the number of picks, optimizing packing of the order pallets in accordance with product type, minimizing the number of order pallets and optimizing packing of the order pallets in accordance with product priority type.

6. A supply chain management system as claimed in claim 1, further comprising a delivery dispatch controller for controlling dispatch of the order pallets.

7. A supply chain management system as claimed in claim 6, wherein the pick grid controller is operably coupled to the delivery dispatch controller for generating the pick grid instructions according to dispatching of the order pallets.

8. A supply chain management system as claimed in claim 6, further comprising a delivery dispatch optimizer for optimizing the dispatch of the order pallets.

9. A supply chain management system as claimed in claim 8, wherein the delivery dispatch optimizer is configured for at least one of minimizing the number of deliveries, minimizing delivery time, minimizing delivery distances, minimizing delivery cost and delivery of priority goods.

10. A supply chain management system as claimed in claim 1, wherein the e-commerce subsystem further comprises an API interface for updating the pricing data.

11. A supply chain management system as claimed in claim 1, wherein the optimized parameters are used to optimize the supply orders in accordance with aggregation target parameters comprising at least one of minimizing inventory levels, minimizing the number of orders, minimizing product cost, minimizing delivery cost and optimizing delivery time by product type.

12. A supply chain management system as claimed in claim 4, wherein the optimized parameters are used to optimize the pick grid instructions in accordance with pick grid target parameters comprising at least one of minimizing the number of picks, optimizing the packing of the order pallets in accordance with product type, minimizing the number of order pallets and optimizing priority products.

13. A supply chain management system as claimed in claim 6, wherein the optimized parameters are used to optimize wherein the dispatch instructions in accordance with dispatch target parameters comprising at least one of minimizing the number of deliveries, minimizing delivery time, minimizing delivery distances, minimizing delivery cost and optimizing priority goods.

* * * * *